F. W. CLARY.
SYSTEM OF ELECTRIC CIRCUIT CONTROL.
APPLICATION FILED SEPT. 9, 1907.
926,243.
Patented June 29, 1909.
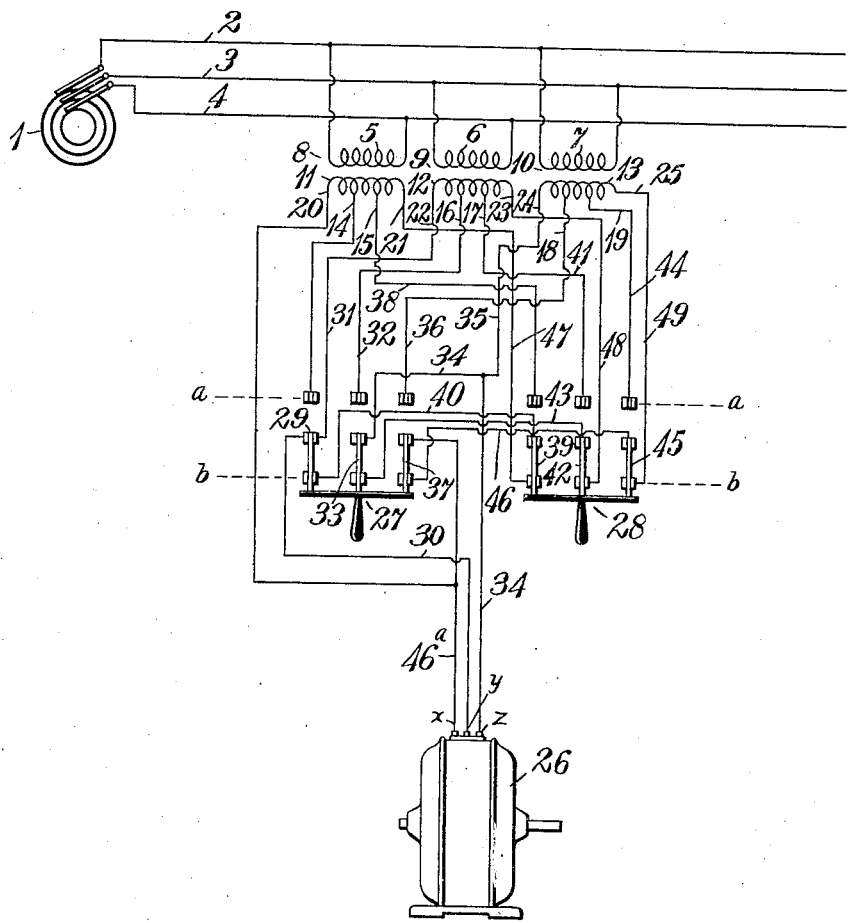
WITNESSES:
Fred H. Miller
R. J. Dearborn.
INVENTOR
Francis W. Clary
BY
Wesley G. Carr
ATTORNEY

UNITED STATES PATENT OFFICE.

FRANCIS W. CLARY, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-CIRCUIT CONTROL.

No. 926,243.     Specification of Letters Patent.     Patented June 29, 1909.

Application filed September 9, 1907. Serial No. 392,056.

*To all whom it may concern:*

Be it known that I, FRANCIS W. CLARY, a citizen of the United States, and a resident of Pittsburg, in the county of Allegheny and State of Pennsylvania, have invented a new and useful Improvement in Systems of Electric-Circuit Control, of which the following is a specification.

My invention relates to systems of electric circuit control, and has special reference to systems for varying the ratio of transformation between the primary and secondary windings of polyphase transformers.

The object of my invention is to provide improved circuit connections and switching devices for simply and efficiently varying the ratio of transformation in delta-connected transformers so that they may be employed not only for starting induction motors and for similar purposes, but also for continuously delivering energy at reduced voltages with a proportional reduction in copper loss.

Well known forms of regulator dials or switching devices have been employed for varying the connections of a motor, or other load circuit to star-connected transformer windings and other voltage-regulating means, but considerable difficulty is experienced in applying these devices for similarly varying the connections to delta-connected transformer windings without materially changing the phase relations existing between the transformer currents. In a three-phase delta-connected transformer system, the windings are ordinarily connected in the same direction; when this is the case, it is impossible to obtain three-phase currents from intermediate taps of less than half the normal transformer voltage. In the prior art, one secondary winding has sometimes been reversed in direction so that a V-connection practically existed and low voltages were obtainable from intermediate taps, but the currents so delivered do not have the normal phase relations to each other, and an inefficient transformation of energy results.

According to my present invention, the secondary windings are not permanently connected in delta, and by excluding corresponding parts of each winding from the circuit, I obtain any desired voltage, while at the same time the proper phase relations are maintained. I employ two triple-pole double-throw switches of any suitable type and so arrange the circuit connections that, by changing the positions of the switches, as hereinafter more fully explained, three different voltages may be obtained, while the energy is at all times supplied to the outgoing circuit with minimum losses.

The single figure of the accompanying drawing is a diagrammatic view of a system arranged in accordance with my invention.

Referring to the drawing, alternating current energy is delivered from a three-phase generator 1 through a transmission line 2—3—4 to delta-connected primary windings 5, 6 and 7 of transformers 8, 9 and 10. These transformers are provided with secondary windings 11, 12 and 13 which are divided into three equal parts by intermediate taps 14, 15, 16, 17, 18 and 19, secondary circuit connections being also established from end terminals 20, 21, 22, 23, 24 and 25. Energy is supplied from the secondary winding of the transformer to a motor 26, circuit connections being determined by triple-pole double-throw switches 27 and 28 which are adapted to occupy positions *a* and *b*.

In starting the motor 26, the switch 27 is thrown to position *a* and the switch 28 is left open. Under these conditions, terminal 20 of the transformer 8 is connected to a terminal *x* of the motor 26 and tap 14 in the same winding is connected through switch blade 29 and conductor 30 to a terminal *y* of the motor. Terminal 22 of the transformer 9 is connected through conductors 31 and 30 to the terminal *y* and tap 16 in the same transformer is connected through conductor 32, switch blade 33 and conductor 34 to a motor terminal *z*. Terminal 24 of the transformer 10 is connected through conductors 35 and 34 to the terminal *z* and tap 18 in this transformer is connected through conductor 36 and switch blade 37 to the motor terminal *x*. It will be observed that, under these conditions, the motor is supplied with energy from a corresponding portion of each of the secondary windings 11, 12 and 13 connected in delta, and in this way it may be started without injury. If switch 27 is now thrown to position *b* and the switch 28 is thrown to position *a*, transformer terminal 20 is connected to motor terminal *x*, as before, tap 15 in the same transformer is connected through conductor 38, switch blade 39, conductor 40, switch blade 29 and conductor 30 to the motor terminal *y*. Transformer terminal 22 is connected to motor terminal *y*, as before, and tap 17 in transformer 9 is connected through conductor 41, switch blade 42, conductor 43, switch blade 33 and conductor 34 to motor terminal z. Terminal 24 of transformer 10 is connected to motor terminal z and tap 19 in the transformer is connected through conductor 44, switch blade 45, conductor 46, switch blades 37 and conductor 46ª to motor terminal x. Thus, the motor is supplied with energy from a larger portion of the transformer secondary windings which are connected in delta, as before.

In order that the motor may be supplied with its full voltage, the switch 28 is now thrown to position b, when transformer terminals 20, 22 and 24 are connected as in both of the preceding cases to motor terminals x, y and z. Terminal 21 of transformer 8 is connected through conductor 47, switch blade 39, conductor 40, switch blade 29 and conductor 30 to motor terminal y. Terminal 23 of transformer 9 is connected through conductor 48, switch blades 42, conductor 43, switch blade 33 and conductor 34 to motor terminal z and terminal 25 of the transformer 10 is connected through conductor 49, switch blade 45, conductor 46, switch blade 37 and conductor 46ª to the motor terminal x.

The principal advantage in the system of my present invention lies in the fact that the same relation exists between the secondary windings of the transformers, whether a whole or a part of the transformer turns are active.

I desire that variations which do not depart from the spirit of my invention shall be included in its scope, and that only such limitations be imposed as are indicated in the appended claims.

I claim as my invention:

1. In a control system, the combination with a polyphase alternating current supply circuit, a receiving circuit and a plurality of transformers interposed between said circuits, of a pair of double-throw switches for varying the voltage applied to the receiving circuit.

2. In a control system, the combination with a three-phase supply circuit, and a receiving circuit, of three transformers interposed between said circuits and having delta-connected secondary windings, and two independently-actuated switches for uniformly varying the secondary voltage applied to the receiving circuit.

3. In a control system, the combination with a three-phase supply circuit, and a receiving circuit, of transformers interposed between said circuits and having delta-connected secondary windings, and two double-throw switches for uniformly varying the voltage applied to the receiving circuit from the three transformer secondaries.

4. In a control system, the combination with a three-phase supply circuit, and a receiving circuit, of transformers interposed between said circuits and having delta-connected secondary windings, and two double-throw switches for uniformly varying the voltage supplied to the receiving circuit, the circuit connections being such that a minimum voltage is supplied when one switch is open and the other occupies one closed position, and an intermediate and a maximum voltage are supplied, respectively, when both switches are closed in different relations.

5. In a control system, the combination with a three-phase supply circuit, a three-phase receiving circuit and transformers having primary and secondary windings interposed between the two circuits, said secondary windings having a series of corresponding intermediate taps, of two triple-pole double-throw switches that are adapted to vary the voltage applied to the receiving circuit without disturbing the phase relations of the currents in the receiving circuit.

In testimony whereof, I have hereunto subscribed my name this 30th day of August, 1907.

FRANCIS W. CLARY.

Witnesses:
J. W. WIGGANS,
BIRNEY H‍‍‍‍‍